(12) United States Patent
Pak et al.

(10) Patent No.: US 7,867,940 B2
(45) Date of Patent: Jan. 11, 2011

(54) SUPPORTED CATALYST AND METHOD OF PREPARING THE SAME

(75) Inventors: Chan-ho Pak, Seoul (KR); Hyuk Chang, Seongnam-si (KR); Dae-Jong Yoo, Yongin-si (KR); Seol ah Lee, Yongin-si (KR); Gongguan Sun, Dalian (CN); Luhua Jiang, Dalian (CN); Qin Xin, Dalian (CN)

(73) Assignee: Samsung SDI Co., Ltd., Yongin-si (KR)

( * ) Notice: Subject to any disclaimer, the term of this patent is extended or adjusted under 35 U.S.C. 154(b) by 825 days.

(21) Appl. No.: 11/334,472

(22) Filed: Jan. 19, 2006

(65) Prior Publication Data

US 2006/0159980 A1    Jul. 20, 2006

(30) Foreign Application Priority Data

Jan. 20, 2005   (KR) ............... 10-2005-0005540

(51) Int. Cl.
| | |
|---|---|
| H01M 4/02 | (2006.01) |
| H01M 4/88 | (2006.01) |
| B01J 31/00 | (2006.01) |
| B01J 21/18 | (2006.01) |
| B01J 23/00 | (2006.01) |
| B01J 23/40 | (2006.01) |
| B01J 23/74 | (2006.01) |
| H01M 4/36 | (2006.01) |
| H01M 4/92 | (2006.01) |
| H01M 4/90 | (2006.01) |
| B01J 37/00 | (2006.01) |
| C08F 4/02 | (2006.01) |
| C08F 4/60 | (2006.01) |

(52) U.S. Cl. ............... 502/159; 502/101; 502/168; 502/182; 502/185; 429/523; 429/524; 429/526

(58) Field of Classification Search ............... 502/101, 502/159, 168, 182, 185; 429/40–44, 523, 429/524, 526

See application file for complete search history.

(56) References Cited

U.S. PATENT DOCUMENTS 5,068,161 A * 11/1991 Keck et al. ............... 429/44

(Continued)

FOREIGN PATENT DOCUMENTS

CN        1425499        6/2003

(Continued)

OTHER PUBLICATIONS

"Surfactant stabilized Pt and Pt alloy electrocatalyst for polymer electrolyte fuel cells," Xin Wang et al. Electrochimica Acta 47 (2002), pp. 2981-2987.*

(Continued)

*Primary Examiner*—Patricia L Hailey
(74) *Attorney, Agent, or Firm*—Christie, Parker & Hale, LLP (57) ABSTRACT

A method of preparing a supported catalyst includes dissolving a cation exchange polymer in alcohol to prepare a solution containing cation exchange polymer; mixing the cation exchange polymer containing solution with a catalytic metal precursor or a solution containing catalytic metal precursor; heating the mixture after adjusting its pH to a predetermined range; adding a reducing agent to the resultant and stirring the solution to reduce the catalytic metal precursor; mixing the resultant with a catalyst support; adding a precipitating agent to the resultant to form precipitates; and filtering and drying the precipitates. The method of preparing a supported catalyst can provide a highly dispersed supported catalyst containing catalytic metal particles with a reduced average size regardless of the type of catalyst support, which provides better catalytic activity than conventional catalysts at the same loading amount of catalytic metal.

11 Claims, 6 Drawing Sheets

U.S. PATENT DOCUMENTS

| | | |
|---|---|---|
| 6,462,095 B1 | 10/2002 | Bönsel et al. |
| 6,649,300 B2 * | 11/2003 | Ito et al. ............... 429/44 |
| 7,132,385 B2 * | 11/2006 | Pak .................. 502/185 |
| 7,345,005 B2 * | 3/2008 | Kourtakis ............ 502/182 |
| 2002/0015875 A1 | 2/2002 | Kim |
| 2003/0017379 A1 | 1/2003 | Menashi |
| 2004/0081880 A1 | 4/2004 | Chang |
| 2004/0127347 A1 | 7/2004 | Lee et al. |
| 2004/0265676 A1 * | 12/2004 | Takagi et al. ............ 429/44 |
| 2007/0244003 A1 * | 10/2007 | Majima et al. ........... 502/319 |
| 2008/0248944 A1 * | 10/2008 | Thate et al. ............ 502/101 |

FOREIGN PATENT DOCUMENTS

| | | |
|---|---|---|
| CN | 1448216 | 10/2003 |
| CN | 1512611 | 7/2004 |
| CN | 200610005055.7 | 7/2008 |
| JP | 2002-305001 * | 10/2000 |
| JP | 2002-305001 | 10/2002 |
| JP | 2003-123775 * | 4/2003 |
| WO | WO 03/061827 | 7/2003 |
| WO | 2005/001978 * | 1/2005 |

OTHER PUBLICATIONS

Loka Subramanyam Sarma et al., "Carbon-supported Pt-Ru catalysts prepared by the Nafion stabilized alcohol-reduction method for application in direct methanol fuel cells", J. Power Source, 139, 44-54 (2005).

Letters Patent for corresponding Chinese Patent 200610005055.7 issued Jul. 23, 2008.

Office Action issued by Japanese Patent Office in Japanese Patent Application No. 2006-013017 on Aug. 25, 2009.

* cited by examiner

SUPPORTED CATALYST AND METHOD OF PREPARING THE SAME

CROSS-REFERENCE TO RELATED APPLICATION

This application claims the benefit of Korean Patent Application No. 2005-5540, filed on Jan. 20, 2005 in the Korean Intellectual Property Office, the disclosure of which is incorporated herein in its entirety by reference.

BACKGROUND OF THE INVENTION

1. Field of the Invention

Aspects of the present invention relate to a supported catalyst and a method of preparing the same, and more particularly, to a highly dispersed supported catalyst containing catalytic metal particles with smaller particle sizes regardless of the type of catalyst support and a method of preparing the same.

2. Description of the Related Art

Conventionally, a supported catalyst refers to a catalyst composed of a catalyst component and a porous catalyst support to which the catalyst component adheres. The porous catalyst support has many pores, and thus a very large surface area. Such a large surface area provides a place in which many catalyst components can be dispersed. The supported catalyst is widely used to accelerate various reactions in various fields.

An example of the supported catalyst is a carbon supported metal catalyst. The carbon supported metal catalyst includes porous carbon particles as a catalyst support and catalytic metal particles as a catalyst component. The carbon supported metal catalyst is also widely used to accelerate various reactions in various fields. An example of the carbon supported metal catalyst is a catalyst contained in an electrode for a fuel cell. More particularly, a cathode and/or an anode of a fuel cell such as a phosphoric acid fuel cell (PAFC), a proton exchange membrane fuel cell (PEMFC), or a direct methanol fuel cell (DMFC) contain the carbon supported metal catalyst which accelerates an electrochemical oxidation of a fuel and/or an electrochemical reduction of oxygen. In this case, carbon particles act as a catalyst support and as an electron conductor. Pt, Pt/Ru alloy, etc. are generally used as the catalytic metal particles.

A method of preparing an anode electrode catalyst by adding a noble metal colloid solution and carbon to an aqueous polymer solution in water at a high temperature in a pressured state is discussed in Japanese Patent Laid-Open Publication No. 2003-123775. In supported catalysts prepared according to the above-described method, as well as in other methods, as the loading amount of catalytic metal particles increases, the average size of catalytic metal particles supported also generally increases. For the reason of this, the improvement of catalytic activity of a supported catalyst through control of the average size of catalytic metal particles and the loading amount of catalytic metal particles is limited.

Moreover, in supported catalysts prepared according to conventional methods, even though the loading amount of catalytic metal particles is reduced, it is difficult to reduce the average size of catalytic metal particles, and thus sufficient dispersion is not obtained. Thus, a technology of improving dispersion while reducing the average size of catalytic metal particles supported on a catalyst support in a loading amount of catalytic metal particles more than or equal to the conventional loading amount of catalytic metal particles needs to be developed.

SUMMARY OF THE INVENTION

Aspects of the present invention provide a method of preparing a highly dispersed supported catalyst containing catalytic metal particles with reduced particle sizes regardless of the type of catalyst support and a supported catalyst prepared using the same.

According to an aspect of the present invention, a method of preparing a supported catalyst includes: dissolving a cation exchange polymer in a solvent to prepare a solution containing a cation exchange polymer; mixing the solution containing the cation exchange polymer with a catalytic metal precursor or a solution containing the catalytic metal precursor; heating the mixture after adjusting its pH to within a predetermined range; adding a reducing agent or a solution containing the reducing agent to the resultant and stirring the solution to reduce the catalytic metal precursor; mixing the resultant with a catalyst support; adding a precipitating agent to the resultant to form precipitates; and filtering and drying the precipitates.

According to an aspect of the present invention, there is provided a supported catalyst prepared according to the above-described method.

According to an aspect of the present invention, in the supported catalyst, catalytic metal particles have an average particle size of 2 to 5 nm.

According to an aspect of the present invention, a highly dispersed supported catalyst is obtained using a catalytic metal particle colloid with good dispersion and a cation exchange polymer regardless of the type of catalyst support.

According to an aspect of the present invention, in the supported catalyst, the content of the cation exchange polymer is 1 to 10 parts by weight based on 100 parts by weight of the catalyst support.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more apparent and more readily appreciated by describing in detail exemplary embodiments thereof with reference to the accompanying drawings in which.

DETAILED DESCRIPTION OF THE EMBODIMENTS

Hereinafter, embodiments of the present invention will be described in more detail in relation to the accompanying drawings and specific examples, wherein like reference numerals refer to the like elements throughout. The embodiments are described below in order to explain the present invention by referring to the figures and examples without limitation thereto.

Figure 1:
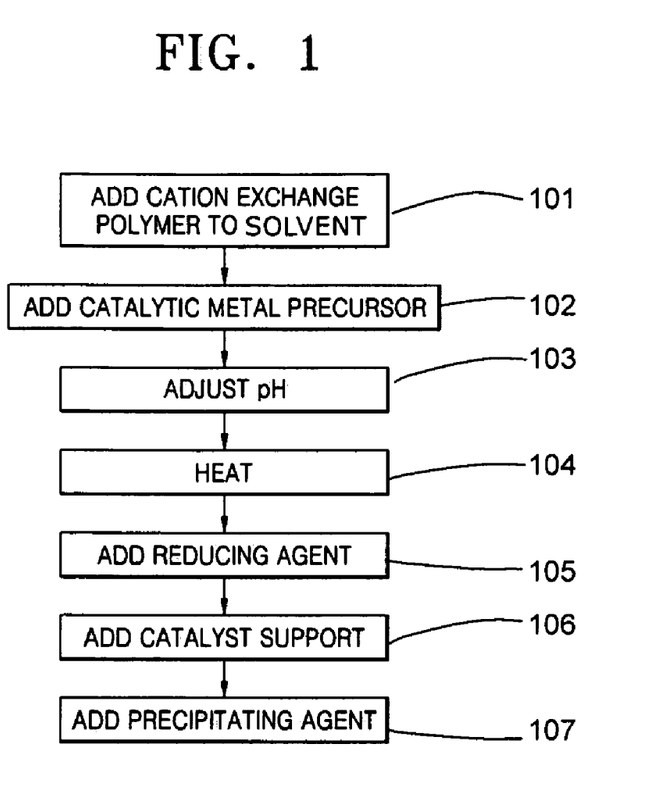
FIG. 1 is a diagram illustrating a process of preparing a supported catalyst according to an embodiment of the present invention.

FIG. 1 is a diagram illustrating a process of preparing a supported catalyst according to an embodiment of the present invention. Referring to FIG. 1, a cation exchange polymer is first added to a solvent to obtain a cation exchange polymer solution (operation 101). While not required in all aspects, the solvent may be water, alcohol, polyol, or other like solvents. Where the solvent is alcohol, examples of the alcohol include, but are not limited to, ethanol, methanol, butanol, isopropanol, etc. The content of the solvent is adjusted to be 0.1 to 1 mg of the cation exchange polymer per 1 ml of the cation exchange polymer solution.

NAFION®, a polymer having a sulfonyl group or a phosphoryl group, or the like is used as the cation exchange polymer according to an aspect of the invention. Examples of such a polymer include sulfonated polyimide, sulfonated polyetherketone, sulfonated polystyrene, sulfonated polysulfone and a mixture thereof. NAFION® refers to a perfluorocarbon sulfonic acid cation exchange resin. In addition, polysulfone, perfluorocarboxylic acid, styrene-vinyl benzene sulfonic acid, and other like polymers may be used as the cation exchange polymer.

In operation 102, a catalytic metal precursor or a catalytic metal precursor solution is added to the solution containing cation exchange polymer, and then mixed. According to an aspect of the invention, the catalyst metal precursor is a precursor containing one or more metals selected from the group consisting of Pt, Ru, Pd, Rh, Ir, Os, Au, or mixtures thereof. $H_2PtCl_4$, $H_2PtCl_6$, $K_2PtCl_4$, $H_2PtCl_6$ or a mixture thereof is used as a Pt precursor according to an aspect of the invention. $RuCl_3$, $(NH_4)_2[RuCl_6]$, or $(NH_4)_2[RuCl_5H_2O]$ is used as a Ru precursor according to an aspect of the invention. $H_2[AuCl_4]$, $(NH_4)_2[AuCl_4]$, or $H[Au(NO_3)_4]H_2O$ is used as a Au precursor according to an aspect of the invention. In the case of an alloy catalyst, a mixture of metal precursors having a mixing ratio corresponding to a desired metal atomic ratio is used. However, it is understood that other precursors can be used or developed for the Pt, Ru and/or Au.

In an embodiment of the present invention, the content of the cation exchange polymer is 4 to 40 parts by weight based on 100 parts by weight of the catalytic metal precursor. If the content of the cation exchange polymer is less than 4 parts by weight, agglomeration occurs in a solution when metal particles are formed, and thus sizes of catalytic metal particles may increase. If the content of the cation exchange polymer is greater than 40 parts by weight, metal particles have highly hydrophobic surfaces, and thus are not uniformly supported on carbon.

The catalytic metal precursor solution is prepared by mixing the catalytic metal precursor with a solvent. Examples of the solvents include, but are not limited to, water, alcohol, ethylene glycol, or other like solvents according to an aspect of the invention. The content of the catalytic metal precursor in the catalytic metal precursor solution is preferably 0.1 to 100 mg/ml. If the content of the catalytic metal precursor is greater than 100 mg/ml, metal particles precipitate due to instability. If the content of the catalytic metal precursor is less than 0.1 mg/ml, reduced metal particles may not adhere to carbon, and thus, it is not preferable. However, it is understood that other contents may be used or developed according to the material used.

The pH of the obtained mixture is adjusted to 7-12 (in particular, to about 8) in operation 103. The pH of the mixture is adjusted in operation 103 to a predetermined range using a base, such as a NaOH aqueous solution according to an aspects of the invention.

In operation 104, the pH adjusted mixture is heated to 70 to 90° C. At the same temperature, a reducing agent or a solution containing reducing agent is added to the mixture (operation 105) and the mixture is stirred to reduce metal ions of the catalytic metal precursor to catalytic metal particles. If the heating temperature is less than 70° C., an effect of facilitating reduction is trivial. If the heating temperature is greater than 90° C., it is difficult to expect uniform reduction due to too rapid reduction and sizes of catalytic metal particles increase.

The reducing agent added in operation 105 reduces the catalytic metal precursor to a corresponding catalytic metal. Examples of the reducing agent include, but are not limited to, formaldehyde, formic acid, polyol, hydrazine, sodium borohydride, hydrogen gas, etc. Examples of polyol include, but are not limited to, ethylene glycol, glycerol, diethylene glycol, triethylene glycol, etc.

While not required in all aspects, when a solution containing the reducing agent is used, a solvent mixed with the reducing agent may be the same as used when preparing the solution containing catalytic metal precursor. The content of the reducing agent is 5 to 50 moles based on 1 mole of the catalytic metal precursor. The content of the reducing agent in the solution containing reducing agent is preferably 2 to 10 parts by weight based on 100 parts by weight of the solution containing reducing agent.

Then, the resultant is cooled to room temperature (25° C.). A catalyst support is added thereto (operation 106). Subsequently, a precipitating agent is added in operation 107 and the result is stirred for a predetermined time. The catalyst support is not particularly restricted. Examples include Vulcan, Ketjen black, acetylene black, activated carbon powder, carbon molecular sieve, carbon nanotube, activated carbon having micropores, mesoporous carbon or combinations thereof. The content of the catalyst support is 65 to 400 parts by weight based on 100 parts by weight of the metallic catalyst according to an aspect of the invention. If the content of the catalyst support is less than 65 parts by weight, sizes of the catalytic metal particles may increase. If the content of the catalyst support is greater than 400 parts by weight, the loading amount is not sufficient to be used as a fuel cell catalyst.

While not required in all aspects, an acidic solution is used as the precipitating agent in operation 107. Examples of the acidic solution include, but are not limited to, an HCl solution, $NaNO_3$, an NaCl solution, or other like solutions. According to an aspect of the invention, the HCl solution is used and a concentration of the HCl solution is 1 to 3 M. Preferably, the amount of the precipitating agent used is so large as to make the pH of the whole solution 3 or less.

Precipitates are formed by stirring, and then filtered and washed with excessive deionized water. The obtained powder is dried to form a supported catalyst. The drying is performed at 50 to 100° C. In the supported catalyst, catalytic metal particles with an average particle size of 2 to 5 nm are uniformly distributed on the catalyst support. Thus, further improved catalytic activity can be obtained.

As discussed herein, the average particle size implies an average particle diameter when catalytic metal particles have a spherical form. In the supported catalyst of the present embodiment, if the average particle size of the catalytic metal particles is out of the above range, it is not preferable in terms of catalytic activity. The supported catalyst of the present embodiment is a highly dispersed supported catalyst. As discussed herein, the term "highly dispersed" implies that an average particle size of catalytic metal particles supported on a porous catalyst support is very small compared to a conventional supported catalyst and the catalytic metal particles are uniformly dispersed on carbon without agglomeration.

Figure 2:
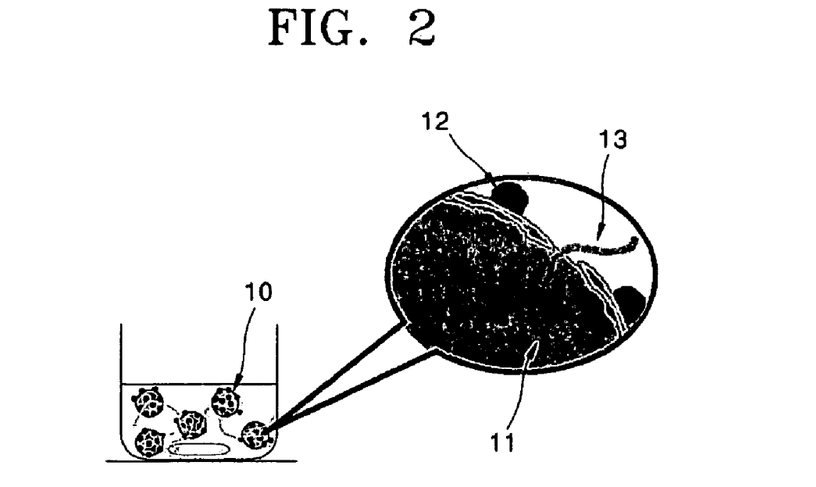
FIG. 2 is a schematic diagram of a supported catalyst according to an embodiment of the present invention.

Referring to FIG. 2, the highly dispersed supported catalyst 10 of the present embodiment includes a porous catalyst support 11, catalytic metal particles 12 adsorbed to the catalyst support 11, and a cation exchange polymer (so called "ionomer") 13. The cation exchange polymer 13 is introduced before the catalytic metal particles 12 are reduced and is expected to prevent agglomeration of catalyst metal particles 12 during reduction and to facilitate proton conduction when applied in a fuel cell since the polymer 13 is present between the catalytic metal particles 12.

The content of the cation exchange polymer 13 is 1 to 10 parts by weight based on 100 parts by weight of a porous catalyst support 11. The content of catalytic metal particles 12 is 20 to 61 parts by weight based on 100 parts by weight of the catalyst support 11. However, other weights can be used.

In the present embodiment, particles 12 adsorbed to the catalyst support 11 are Pt, Ru, Pd, Rh, Ir, Os, Au, or combinations thereof.

The supported catalyst can be used in an electrode catalyst layer of a fuel cell according to an aspect of the invention. In addition, the supported catalyst is used or is usable as a catalyst for various chemical reactions, such as hydrogenation, dehydrogenation, coupling, oxidation, isomerization, decarboxylation, hydrocracking, and/or alkylation, etc. However, uses other than in a fuel cell are possible.

Figure 3:
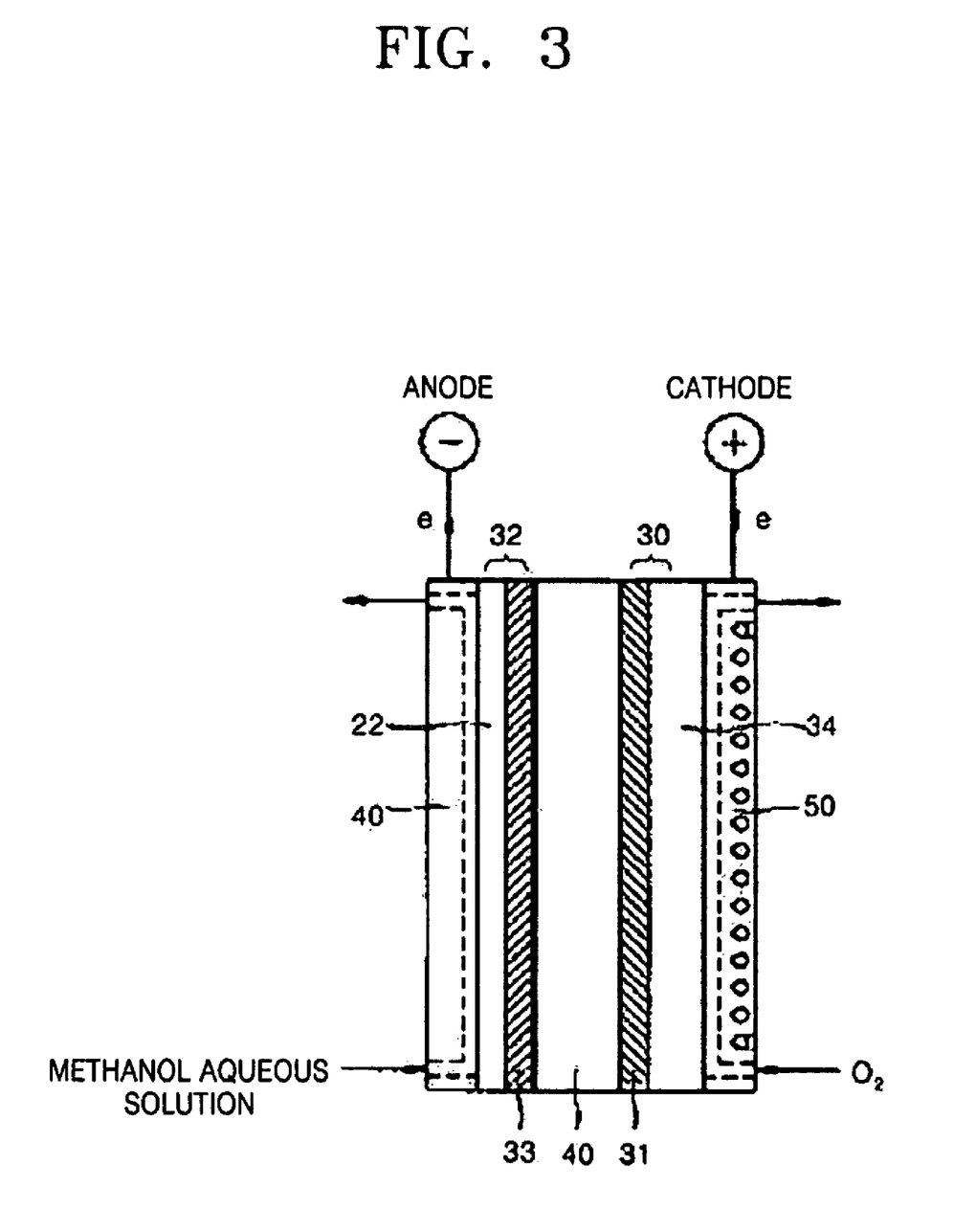
FIG. 3 is a schematic diagram of a fuel cell according to an embodiment of the present invention.

A direct methanol fuel cell (DMFC) according to an embodiment of the present invention using the supported catalyst in the formation of a cathode layer will now be described in more detail with reference to FIG. 3. However, it is understood that the invention is usable with other fuel cells such as PAFC and PEMFC. Referring to FIG. 3, the DMFC of the present embodiment includes an anode 32 to which a fuel is supplied, a cathode 30 to which an oxidant is supplied, and an electrolyte membrane 40 interposed between the anode 32 and the cathode 30. In general, the anode 32 includes an anode diffusion layer 22 and an anode catalyst layer 33. The cathode 30 includes a cathode diffusion layer 34 and a cathode catalyst layer 31. The anode catalyst layer and/or the cathode catalyst layer are composed of the supported catalyst described above in relation to FIGS. 1 and 2.

A bipolar plate 50 includes a passage for supplying a fuel to the anode 32 and acts as an electron conductor for transporting electrons produced in the anode 32 to an external circuit or an adjacent unit cell. A bipolar plate 50 includes a passage for supplying an oxidant to the cathode 30 and acts as an electron conductor for transporting electrons supplied from the external circuit or the adjacent unit cell to the cathode 30. In the shown DMFC, a methanol aqueous solution is generally used as the fuel supplied to the anode 32 and air is generally used as the oxidant supplied to the cathode 30.

The methanol aqueous solution transported to the anode catalyst layer 33 through the anode diffusion layer 22 is decomposed into electrons, hydrogen ions, carbon dioxide, etc. Hydrogen ions migrate to the cathode catalyst layer 31 through the electrolyte membrane 40, electrons migrate to the external circuit, and carbon dioxide is discharged. In the cathode catalyst layer 31, hydrogen ions transported through the electrolyte membrane 40, electrons supplied from the external circuit, and oxygen in air transported through the cathode diffusion layer 32 react to produce water.

In such a DMFC, the electrolyte membrane 40 acts as a hydrogen ion conductor, an electron insulator, a separator, etc. When the electrolyte membrane 40 acts as the separator, it prevents unreacted fuel from being transported to the cathode 30 or a unreacted oxidant from being transported to the anode 32. Cation exchange polymers, such as perfluorosulfonic acid-based polymer having fluorinated alkylene in their backbone and sulfonic acid groups at the terminals of fluorinated vinylether side chains (e.g. NAFION® by DuPont), are generally used as materials for the electrolyte membrane 30 of the DMFC. Such a DMFC can be used for portable devices, such as portable computers, phones, personal digital assistants, portable media players, and/or like devices.

Aspects of the present invention will be described in greater detail with reference to the following examples. The following examples are for illustrative purposes and are not intended to limit the scope of the invention.

EXAMPLE 1

10 ml of ethanol was placed in a 250 ml round bottom flask and 133 mg of a 5 wt % NAFION® solution (available from DuPont) was added thereto. Then, 8.1 ml of hexachloroplatinic (IV) acid aqueous solution in ethylene glycol (Pt content: 7.4 mg Pt/ml EG) was added, followed by the addition of 4.5 ml sodium hydroxide (1M) solution until a pH of 8 had been reached. After stirring for about 30 minutes, the mixture was heated to 80° C.

Figure 4:
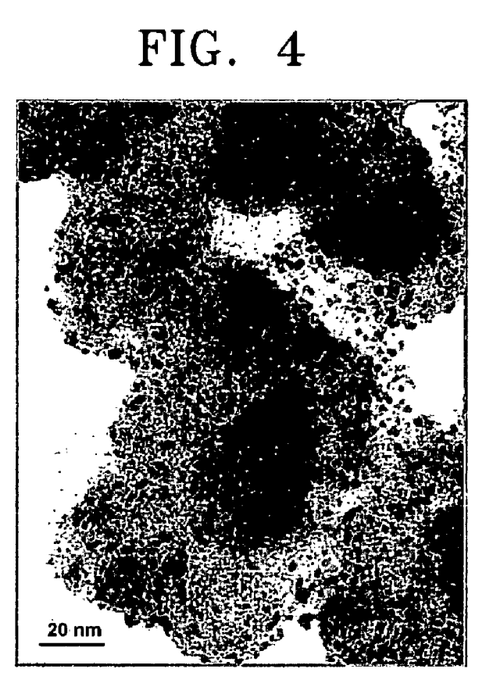
FIGS. 4 and 5 are TEM photographs of supported catalysts according to Example 1 of the present invention and Comparative Example 1.

7 ml of a formaldehyde solution in alcohol (3.7 wt %) was added dropwise and stirred, and then cooled to room temperature. 90 mg of Vulcan XC-72 was added to the obtained mixture and homogeneously mixed by stirring. After adding 9.1 ml of a 1.5 M HCl aqueous solution as a precipitating agent, the mixture was stirred for 6 hours, then filtered and washed with deionized water. The resultant was dried in an oven at 70° C. to obtain 40 wt % Pt/C particles. An average particle size of the Pt/C particles measured through TEM analysis was about 2.5 to 3 nm (FIG. 4).

EXAMPLE 2

20 wt % Pt/C particles were obtained in the same manner as Example 1, except that 65.7 mg of the NAFION® solution, 4 ml of hexachloroplatinic (IV) acid solution in ethylene glycol (Pt content: 7.4 mg Pt/ml EG) and 2.5 ml of the 1 M sodium hydroxide solution were used. An average particle size of the Pt/C particles measured through TEM analysis was about 2 nm.

EXAMPLE 3

20 wt %-10 wt % PtRu/C particles were obtained in the same manner as Example 1, except that 99 mg of the NAFION® solution was used, 4 ml of hexachloroplatinic (IV) acid solution in ethylene glycol (Pt content: 7.4 mg Pt/ml EG) and 2 ml of a RuCl$_3$ solution (Ru content: 7.4 ml Ru/ml EG) were simultaneously added, and 10 ml of the 1 M sodium hydroxide solution were used. An average particle size of the PtRu/C particles measured through TEM analysis was about 2 nm.

EXAMPLE 4

30 wt %-15 wt % of PtRu/C particles was obtained in the same manner as Example 3, except that 148 mg of the NAFION solution was used, 4 ml of hexachloroplatinic (IV) acid solution in ethylene glycol (Pt content: 7.4 mg Pt/ml EG) and 2 ml of a RuCl$_3$ solution (Ru content: 7.4 ml Ru/ml EG) were simultaneously added, and 10 ml of the 1 M sodium hydroxide solution were used. An average particle size of the PtRu/C particles measured through TEM analysis was about 2.5 nm.

Comparing the method of preparing PtRu/C in Examples 3 and 4 with the method disclosed in Japanese Patent Laid-Open Publication No. 2003-123775, while both methods prepare catalysts using a cation exchange polymer, catalytic metal particles prepared according to Examples 3 and 4 were much smaller than those of the cited reference since reduction was performed at atmospheric pressure and a temperature lower than 90° C. As mentioned above, if a reducing agent is added at a temperature higher than 90° C., catalyst particles become large due to too rapid a reduction.

EXAMPLES 5-7

40 wt % Pt/C particles were obtained in the same manner as Example 1, except that Ketjen Black (KB, specific surface area: 800 m$^2$/g), Multi-Wall Carbon Nanotube (MWCNT, specific surface area: 200 m$^2$/g) and Denka black (DB, specific surface area: 67 m$^2$/g) were used instead of Vulcan XC-72. Average particle sizes of the Pt/C particles measured through XRD analysis were 2.4 nm for the KB support, 2.9 nm for the MWCNT support, and 2.3 nm for the DB support.

COMPARATIVE EXAMPLE 1

40 wt % Pt/C particles was obtained in the same manner as Example 1, except that the NAFION® solution was not used. An average particle size of the Pt/C particles measured through TEM analysis was about 7 nm (FIG. 5).

Figure 5:
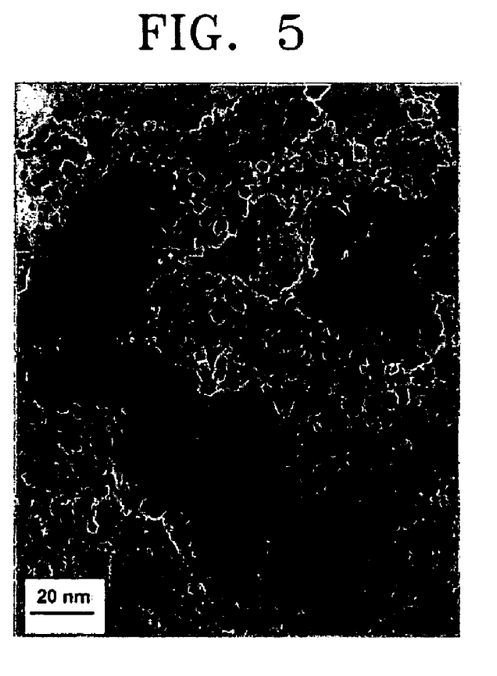

Referring to FIGS. 4 and 5, it can be seen that the average particle size of the supported catalyst particles according to Example 1 is smaller than that of the supported catalyst particles according to Comparative Example 1.

Figure 6:
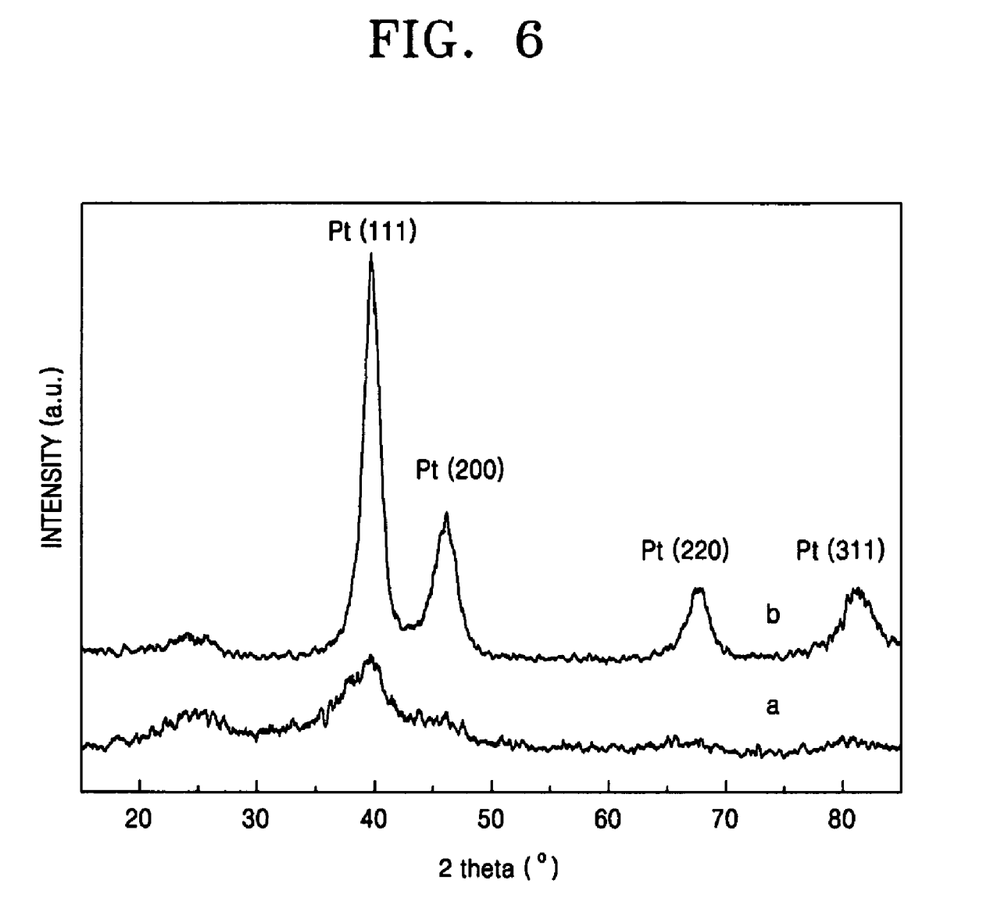
FIG. 6 is an X-ray diffraction analysis spectrum of supported catalysts according to Example 1 of the present invention and Comparative Example 1.

For the supported catalysts according to Example 1 and Comparative Example 1, an X-ray diffraction (XRD) analysis was performed and the results are illustrated in FIG. 6. Referring to FIG. 6, an XRD (a) spectrum for Example 1 has broader peaks than an XRD (b) spectrum for Comparative Example 1, indicating that the size of catalytic metal particles of Example 1 is smaller than that of catalytic metal particles of Comparative Example 1. That is, the cation exchange polymer prevents agglomeration between Pt particles, and thus small catalyst particles are supported on the carbon support.

EXAMPLE 8

Fabrication of a Fuel Cell

The Pt/C catalyst prepared in Example 1 was used as a cathode catalyst and a NAFION® 115 membrane (DuPont) was used as an electrolyte membrane of a single cell. 32 mg of 40 wt % Pt/C (Example 1), water, and 4 ml of ethanol were homogeneously mixed by ultrasonic and stirring. 70 mg of 5 wt % NAFION® solution was added to the mixture and mixed for 30 minutes by ultrasonic to obtain a homogeneous catalyst layer forming composition.

Next, the composition was applied to a diffusion layer (area: 2.5×5 cm$^2$) to obtain a cathode with a noble metal loading amount of 1 mg Pt/cm$^2$. 20 wt %-10 wt % PtRu/C (Johnson Matthey Inc.) was applied to an anode diffusion layer (area: 2.5×5 cm$^2$) to obtain an anode with a noble metal loading amount of 2 mg Pt/cm$^2$.

A NAFION® solution was sprayed on the cathode and the anode and dried such that a dry NAFION® loading amount on the cathode and the anode was 1 mg/cm$^2$. The cathode and the anode were hot pressed on both sides of the electrolyte membrane at 130° C. for 2 minutes to form a single cell. In the single cell, the cathode operated at about 90° C. An active area of the single cell was 4 cm$^2$, a 1M methanol solution was supplied to the anode at a flow rate of 1 ml/min, and oxygen was supplied to the cathode at a pressure of 0.2 Mpa.

COMPARATIVE EXAMPLE 2

Fabrication of a Fuel Cell

A fuel cell was fabricated in the same manner as Example 8, except that the Pt/C catalyst of Comparative Example 1 substituted the Pt/C catalyst of Example 1.

REFERENCE EXAMPLE 1

A fuel cell was fabricated in the same manner as Example 1, except that a 40 wt % Pt/C (Johnson Matthey Inc.) was used as a cathode catalyst and a 20 wt %-10 wt % PtRu/C was used as an anode catalyst.

Figure 7:
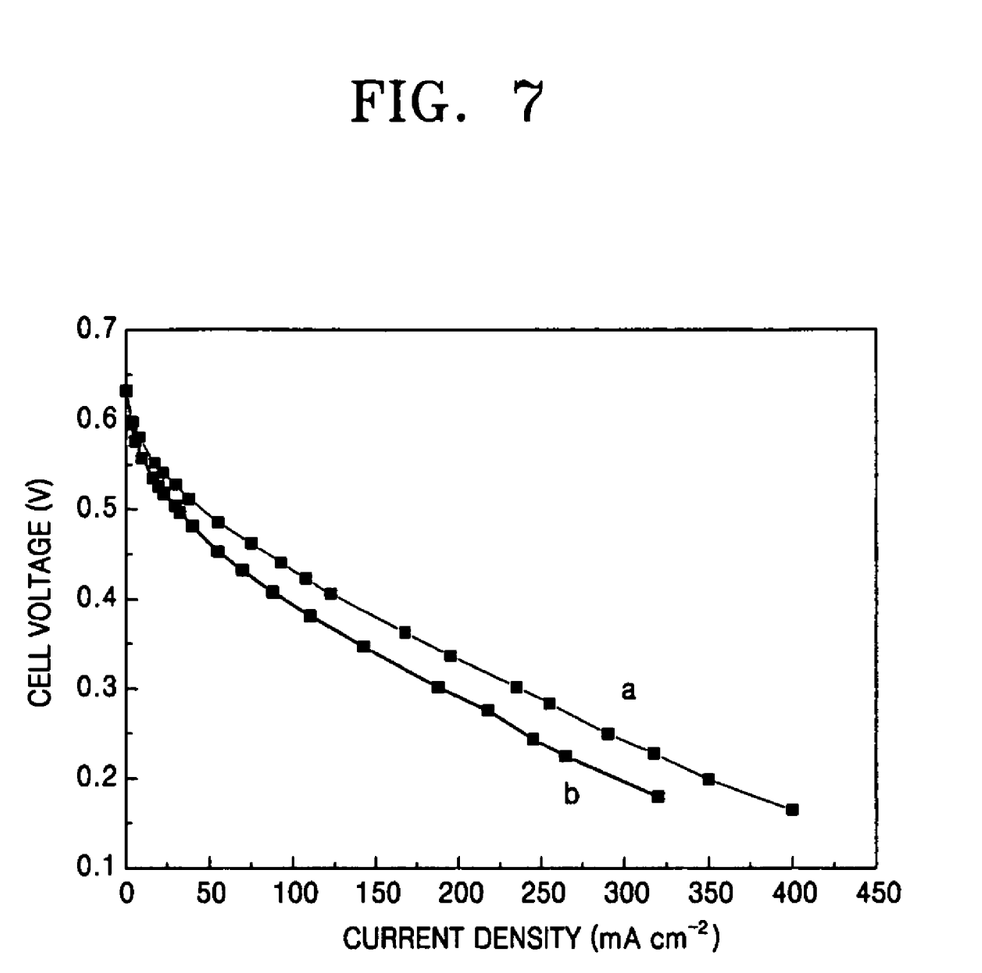
FIG. 7 is a graph illustrating the relationship between the cell potential and the current density in direct methanol fuel cells according to Example 8 of the present invention and Comparative Example 2.

For fuel cells obtained in Example 8 and Comparative Example 2, the relationship between the voltage and the current density was investigated and the results are illustrated in FIG. 7. Referring to FIG. 7, it can be seen that the fuel cell of Example 8 (curve a) has better cell efficiency than the fuel cell of Comparative Example 2 (curve b).

Figure 8:
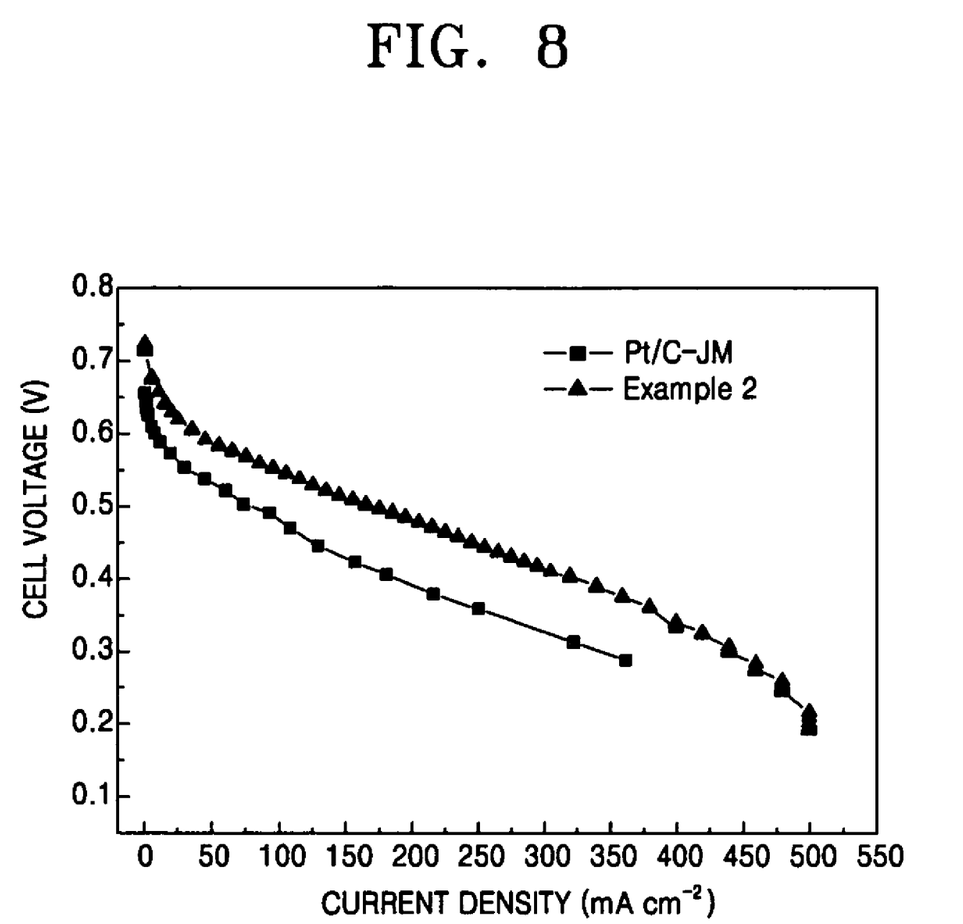
FIG. 8 is a graph illustrating the relationship between the cell potential and the current density in direct methanol fuel cells according to Example 8 of the present invention and Reference Example 1.

For fuel cells obtained in Example 8 and Reference Example 1, the relationship between the voltage and the current density was investigated and the results are illustrated in FIG. 8. It can be seen from FIG. 8 that a highly dispersed 40 wt % Pt/C can be synthesized using a cation exchange polymer and better cell efficiency than the commercially available catalyst can be ensured.

The method of preparing a supported catalyst according to an embodiment of the present invention provides a highly dispersed supported catalyst containing catalytic metal particles with a reduced average size regardless of the type of catalyst support. The highly dispersed supported catalyst has better catalytic activity than other catalysts at the same loading amount of catalytic metal due to a reduced average size of catalytic metal particles. Specifically, other methods include preparing a well dispersed PtRu catalyst using Nafion stabilized alcohol-reduction method as discussed in Loka Subramanyam Sarma, Tzu Dai Lin, Yin-Wen Tsai, Jium Ming Chen and Bing Joe Hwang, J. Power Source, 139, 44-54 (2005), or preparing an anode electrode catalyst by adding a noble metal colloid solution and carbon to an aqueous polymer solution in water at a high temperature in a pressured state is discussed in Japanese Patent Laid-Open Publication No. 2003-123775 result in an increase of the average size of the catalytic metal particles supported as the loading amount of catalytic metal particles increases. Thus, in these other methods, the improvement of catalytic activity of a supported catalyst through control of the average size of catalytic metal particles and the loading amount of catalytic metal particles is limited as compared to the sizes and loading amounts produced through aspects of the invention.

While aspects of the present invention have been particularly shown and described with reference to exemplary embodiments thereof, it will be understood by those of ordinary skill in the art that various changes in form and details may be made therein without departing from the spirit and scope of the present invention as defined by the following claims and equivalents thereof.

The invention claimed is:

1. A method of preparing a supported catalyst, the method comprising:
    dissolving a cation exchange polymer in a solvent to prepare a solution containing the cation exchange polymer;
    mixing the solution with a catalytic metal precursor or a solution containing the catalytic metal precursor, to produce a mixture;
    heating the mixture to a temperature greater than 70° C. and less than 90° C., after adjusting a pH of the mixture to about 8, using a base, to obtain a resultant;
    adding a reducing agent selected from the group consisting of formaldehyde, formic acid, polyol, hydrazine, sodium borohydride, hydrogen gas, and mixtures thereof, to the resultant and stirring, to reduce the catalytic metal precursor and to obtain another resultant;
    mixing the obtained another resultant with a catalyst support;
    adding a precipitating agent to the mixed another resultant, to form precipitates; and
    filtering and drying the precipitates.

2. The method of claim 1, wherein the cation exchange polymer is at least one selected from the group consisting of perfluorocarbon sulfonic acid cation exchange resin, sulfonated polyimide, sulfonated polyetherketone, sulfonated polystyrene, sulfonated polysulfone, and mixtures thereof.

3. The method of claim 1, wherein a content of the cation exchange polymer is at or between 4 and 40 parts by weight based on 100 parts by weight of the catalytic metal precursor.

4. The method of claim 1, wherein the precipitating agent is an acidic solution.

5. The method of claim 1, wherein the catalytic metal precursor is at least one selected from the group consisting of $H_2PtCl_4$, $H_2PtCl_6$, $K_2PtCl_4$, $H_2PtCl_6$, $(NH_4)_2[RuCl_6]$, $(NH_4)_2[RuCl_5H_2O]$, $H_2[AuCl_4]$, $(NH_4)_2[AuCl_4]$, $H[Au(NO_3)_4]H_2O$, $RuCl_3$, and combinations thereof.

6. The method of claim 1, wherein a content of the catalytic metal precursor in the catalytic metal precursor containing solution is at or between 0.1 and 100 mg/ml.

7. The method of claim 1, wherein the catalyst support is selected from the group consisting of Vulcan, Ketjen black, acetylene black, activated carbon powder, carbon molecular sieve, carbon nanotube, activated carbon having micropores, mesoporous carbon, and mixtures thereof.

8. The method of claim 1, further comprising preparing a cathode or an anode of a fuel cell using the filtered and dried precipitates.

9. The method of claim 1, wherein the solvent is selected from the group consisting of polyol, alcohol, water, and combinations thereof.

10. A method of preparing a supported catalyst, the method comprising:
    mixing a cation exchange polymer solution with a catalytic metal precursor, to produce a mixture
    adjusting the pH of the mixture to about 8, using a base, to obtain a resultant;
    heating the resultant to a temperature greater than at or between 70° C. and less than 90° C.;
    combining a reducing agent with the heated resultant, to reduce the catalytic metal precursor and obtain catalytic metal particles having an average size of from 2 to 5 nm; and
    mixing the catalytic metal particles with a catalyst support and a precipitating agent, such that the catalyst support supports catalytic metal particles.

11. The method of claim 10, wherein the reducing agent is selected from formaldehyde, formic acid, polyol, hydrazine, sodium borohydride, hydrogen gas, and mixtures thereof.

* * * * *

UNITED STATES PATENT AND TRADEMARK OFFICE
CERTIFICATE OF CORRECTION

PATENT NO.         : 7,867,940 B2  
APPLICATION NO.    : 11/334472  
DATED              : January 11, 2011  
INVENTOR(S)        : Chan-ho Pak et al.

Page 1 of 1

It is certified that error appears in the above-identified patent and that said Letters Patent is hereby corrected as shown below:

Column 10, Claim 5, line 1                After "$K_2PtCl_4$,"  
                                          Delete "$H_2PtCl_6$,"

Column 10, Claim 10, lines 24 and 25      After "than"  
                                          Delete "at or between"

Signed and Sealed this  
Thirty-first Day of January, 2012

David J. Kappos  
*Director of the United States Patent and Trademark Office*